Figure 1:
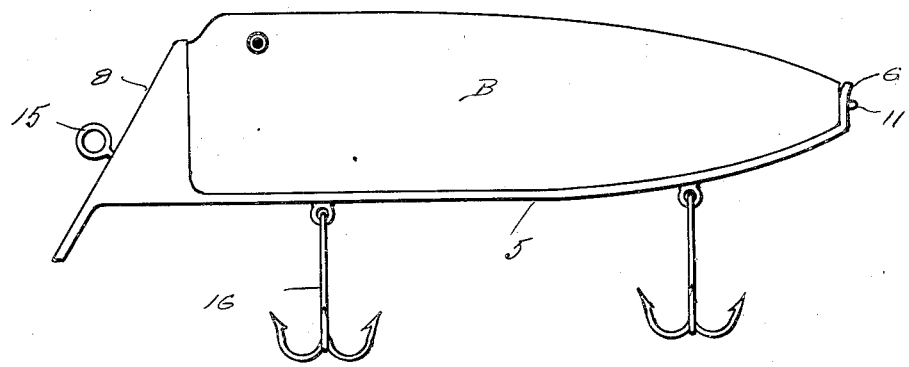

May 26, 1931. H. J. DICK 1,807,283
MULTIPLE BODY ARTIFICIAL FISH LURE
Filed April 8, 1930 2 Sheets-Sheet 1

Inventor
Howard J. Dick

By Clarence A O'Brien
Attorney

May 26, 1931.  H. J. DICK  1,807,283
MULTIPLE BODY ARTIFICIAL FISH LURE
Filed April 8, 1930   2 Sheets-Sheet 2
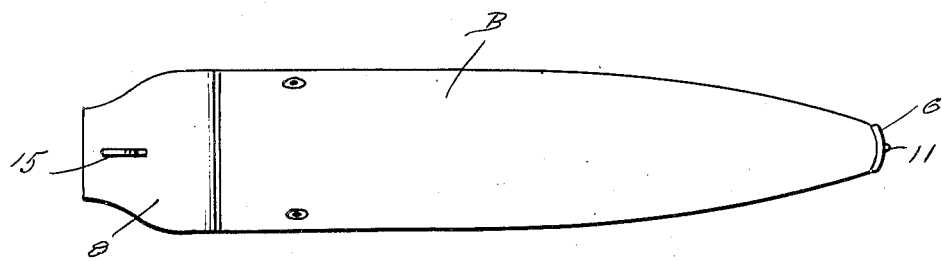
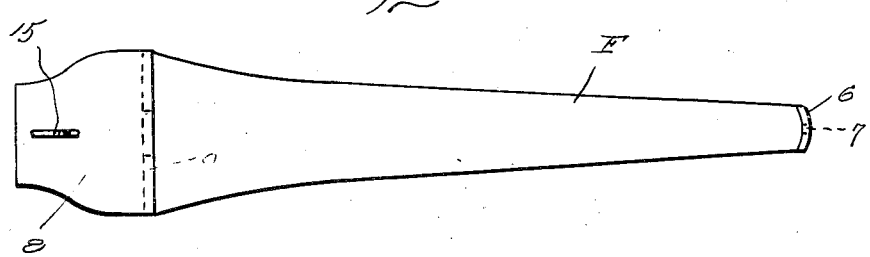
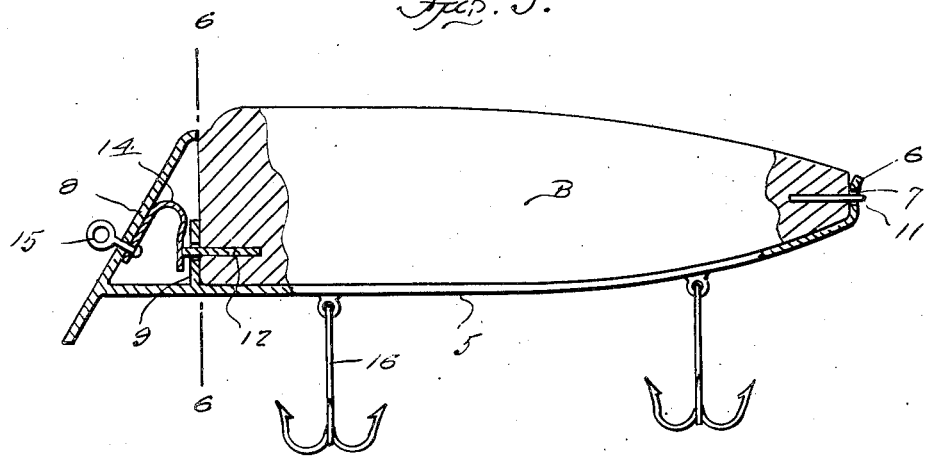
Inventor
Howard J. Dick
By Clarence A. O'Brien
Attorney Patented May 26, 1931

1,807,283

UNITED STATES PATENT OFFICE

HOWARD J. DICK, OF BENTON HARBOR, MICHIGAN

MULTIPLE BODY ARTIFICIAL FISH LURE

Application filed April 8, 1930. Serial No. 442,590.

The present invention relates to a fish lure and has for its prime object to provide a frame capable of carrying a fish lure body which is detachably connected thereto whereby it is possible to use the same frame for carrying one of a plurality of different designed lure body.

Another very important object of the invention resides in the provision of a fish lure of this nature which is exceedingly simple in its construction, inexpensive to manufacture, easy to manipulate, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 4:
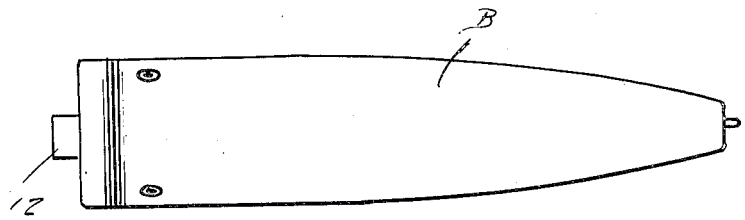
Figure 6:
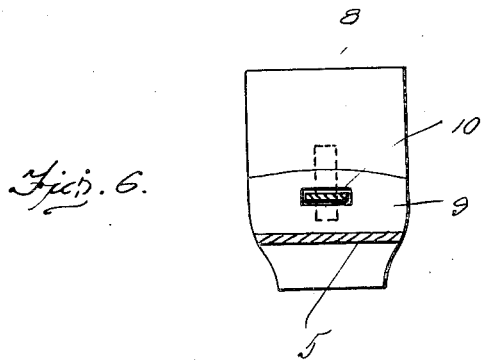

In the drawings:

Figure 1 is a side elevation of the device embodying the features of this invention, Figure 2 is a top plan view thereof, Figure 3 is a vertical longitudinal section therethrough, Figure 4 is a top plan view of the lure body, Figure 5 is a top plan view of the frame, and Figure 6 is a sectional view taken substantially on the line 6—6 of Figure 3.

Referring to the drawings in detail it will be seen that the letter F denotes generally the frame and the letter B denotes generally the body. The frame F comprises an elongated plate 5 which tapers rearwardly in width and has its rear end slightly curved upwardly and terminating in a rising tail piece 6 the top of which curves slightly rearwardly, this tail piece is formed with an opening 7.

A head structure of the frame comprises a front plate 8 which extends above and below the front end of the bottom plate 5 and is disposed at an acute angle thereto so as to incline upwardly and rearwardly.

A flange 9 rises from the plate 5 adjacent its forward end and is formed with a slot 10. The body B may be of any suitable shape and decorated in any suitable manner and is adapted to be seated on the plate 5 and has a pin 11 projecting from the rear end thereof for engagement in the opening 7 and a tongue 12 projecting from the front end thereof to extend through the slot 10.

The body B is mounted in the frame F by first inserting the tongue 12 through the slot 10, then bringing the body into horizontal position so that the rear pin 11 engages the rising tail piece 6. Due to the resiliency thereof and its curved formation, a slight pressure on the rear end of the body while the frame is supported will result in sufficient displacement of the tail piece to permit the rear pin 11 to be slid down the contiguous face of the said tail piece to permit seating of the rear pin 11 in the slot 7. The spring 14 anchored to the plate 8 helps the seating and retains seated the rear pin 11 by exerting a longitudinal pressure on the tongue 12.

The spring 14 is anchored in place by an eye rivet 15 to which a line may be attached and suitable hooks 16 may be engaged with the body plate 5.

It is thought the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A device of the class described including a frame comprised of a bottom plate and a front plate at an angle to the bottom plate, a body, said bottom plate having a portion extending upwardly at its rear end and formed with an opening, a flange rising from the front portion of the bottom plate and having a slot, said body having a pin to extend through the opening and a tongue to extend through the slot.

2. A device of the class described including a frame comprised of a bottom plate and a front plate at an angle to the bottom plate, a body, said bottom plate having a portion extending upwardly at its rear end and formed with an opening, a flange rising from the front portion of the bottom plate and having a slot, said body having a pin to extend through the opening and a tongue to extend through the slot, and a spring anchored on the front plate to impinge against the tongue to hold the body rearwardly with the pin inserted through the opening.

In testimony whereof I affix my signature.

HOWARD J. DICK.